United States Patent [19]

Oohori

[11] Patent Number: 5,381,159

[45] Date of Patent: Jan. 10, 1995

[54] COORDINATE INPUT DEVICE

[75] Inventor: Toshiki Oohori, Iwaki, Japan

[73] Assignee: Alps Electric Co., Ltd., Tokyo, Japan

[21] Appl. No.: 66,450

[22] Filed: May 24, 1993

[30] Foreign Application Priority Data

May 29, 1992 [JP] Japan .............................. 4-036455[U]

[51] Int. Cl.$^6$ .............................................. G09G 5/00
[52] U.S. Cl. .................................... 345/163; 361/212
[58] Field of Search .............................. 345/163–167; 361/212, 220, 221, 222

[56] References Cited

U.S. PATENT DOCUMENTS 4,586,106  4/1986  Frazier ................................... 361/212
4,654,746  3/1987  Lewis, Jr. et al. ...................... 361/212
4,951,034  7/1990  Mazzone et al. .

Primary Examiner—Jeffery Brier
Attorney, Agent, or Firm—Guy W. Shoup; Patrick T. Bever

[57] ABSTRACT

A housing 1 made of a synthetic resin is placed on a printed circuit board 8 on which a control circuit, a static electricity releasing pattern 10 and so on are formed, and a retainer 7 is mounted on the upper end of the housing 1 to prevent detachment of a ball 3. A conductive ring 15 is fixed to the rear surface of the retainer 7, and a conductive connection pin 16 is fixed to the housing 1 to connect the conductive ring 15 to the static electricity releasing pattern 10. When the static electricity charged on the operator is discharged to the ball 3, it enters the coordinate input device from a gap between the ball 3 and an open portion of the retainer 7, and then is grounded through the conductive ring 15 provided on the rear surface of the retainer 7, the connection pin 16 connected to the conductive ring 15 and then the static electricity releasing pattern 10 on the printed circuit board.

8 Claims, 3 Drawing Sheets

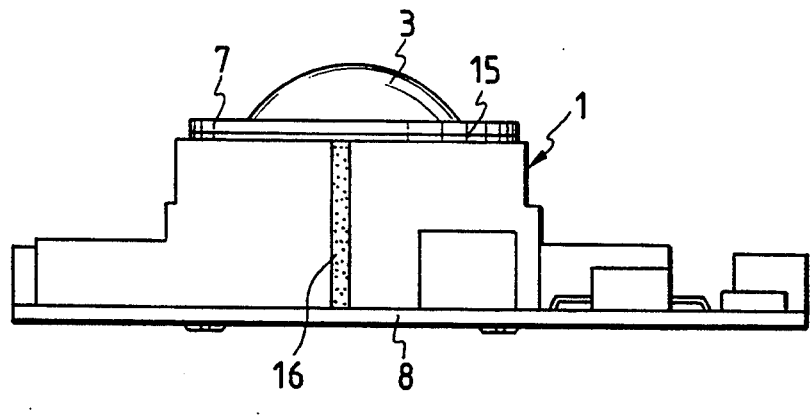
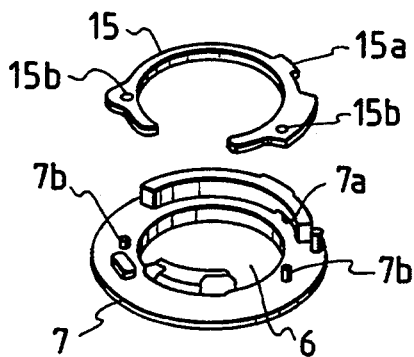
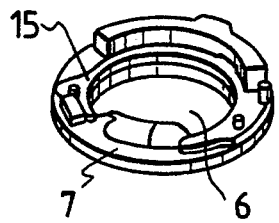
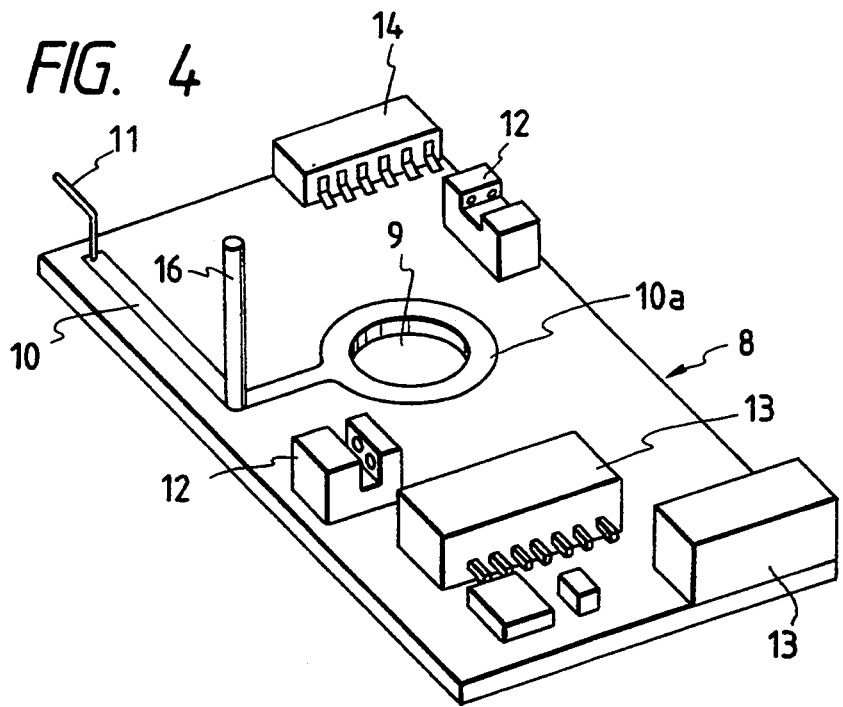

COORDINATE INPUT DEVICE

BACKGROUND OF THE INVENTION

The present invention relates to a coordinate input device for controlling the position of a cursor on a display when the operator rolls a ball with his or her fingers in a desired direction. More particularly, the present invention pertains to an anti-static electricity structure for preventing entry of the static electricity charged on the operator to a control circuit or the like.

One example of the above-described type of coordinate input devices is a trackball designed to move the cursor on a display to a desired coordinate or menu position when the operator rolls with his or her fingers the ball partly protruding from a housing.

FIG. 5 is a perspective view of a conventional coordinate input device of the above-described type. A housing 1 made of a synthetic resin has a semi-spherical accommodating portion 2 which is open at both upper and lower surfaces thereof. A ball 3, which may be a steel ball, is rotatably accommodated in the accommodating portion 2. In the housing 1, a pair of metal rotary shafts 4 are rotatably provided substantially perpendicular to each other in such a manner that they are in contact with the ball 3. A code plate 5 is fixed to one end of each of the rotary shafts 4. A retainer 7 is mounted on the upper end of the housing 1 by an adequate fixing means, e.g., by using the bayonet mounting method (mounting the retainer 7 using teeth which are engaged by pressing and rotating the retainer 7 in an upper opening of the housing 1). The retainer 7 is made of a synthetic resin, and has an open portion 6 at the center thereof. The upper end of the ball 3 protrudes outwardly from the open portion 6 so that the operator can hand operate it. A printed circuit board 8 has a through-hole 9. The housing 1 is placed on and fixed to the printed circuit board 8 with the lower end of the ball 3 located within the through-hole 8 so as to avoid contact of the ball 3 with the printed circuit board 8. A static electricity eliminating pattern 10 is formed on the printed circuit board 8. A ring portion 10a is formed at one end of the static electricity eliminating pattern 10 on both the front and rear surfaces of the printed circuit board 8 and the cross-section of the ring portion 10a in such a manner that it surrounds the through-hole 9. A static electricity eliminating terminal 11 is soldered to the other end of the static electricity eliminating pattern 10. On the printed circuit board 8 are also formed detecting devices 12 each having a light-emitting element and a light-receiving element disposed such that they sandwich the code plate 5, a circuit device 13 constituting the control circuit, a connector 14 and so on. Both of the detecting devices 12 are connected to the circuit device 13 by a conductive pattern which is not shown.

In the thus-arranged coordinate input device, when the operator rolls the ball 3 slightly protruding from the open portion 6 of the retainer 7 mounted on the upper end of the housing 1 with his or her fingers in a desired direction, the two rotary shafts 4 rotate in predetermined directions synchronously with the rotation of the ball 3. Hence, the light-receiving element in each of the detecting devices 12 receives the light from the light-emitting device to detect the amount of rotation of the corresponding code plate 5. The control circuit operates the detection signals obtained by the detecting devices 12, and inputs the resultant X and Y coordinates of the ball 3 to a display device which is not shown. Thus, the cursor on the display, which is not shown, can be moved in a desired direction according to the amount and direction of rotation of the manually operated ball 3. The coordinate input or menu selection is executed by stopping the rotation of the ball 3 after the cursor has been moved to a desired coordinate or menu position and then by turning on an input switch which is not shown.

When the static electricity charged on the operator is discharged to the ball 3 during the manual operation of the ball 3, it is transmitted along the surface of the ball 3 to the ring portion 10a, and then released to a grounding circuit, which is not shown, through the static electricity eliminating pattern 10 and the static electricity eliminating terminal 11.

Since the conventional coordinate input device of the above-described type is constructed such that the static electricity charged on the operator is released via the ball 3 and then the static electricity eliminating pattern 10, entry of the static electricity into the control circuit or a circuit of an external device connected to the control circuit can be prevented, thus preventing erroneous detection or breakage of the circuit to a certain extent. However, since a fine gap is formed between the ball 3 and the ring portion 10a of the static electricity eliminating pattern 10 in order to reduce the contact resistance between the ball 3 and the ring portion 10a, part of the static electricity discharged to the ball 3 may be discharged to the rotary shafts 4 located between the ball 3 and the static electricity eliminating pattern 10 before it reaches the pattern 10. The static electricity released to the rotary shafts 4 may enter the control circuit through the code plate 5 and the detection devices 12, making the anti-static electricity structure an insufficient one.

SUMMARY OF THE INVENTION

In view of the aforementioned problems of the prior art, an object of the present invention is to provide a coordinate input device which is capable of securely releasing the static electricity charged on the operator and is thus reliable.

To achieve the above-described object, the present invention provides a coordinate input device which comprises a lower housing having a ball accommodating portion, a ball rotatably accommodated in the ball accommodating portion, a ball retaining member having an open portion from which part of the ball protrudes, the ball retaining member retaining the ball in the ball accommodating portion, a rotational amount detection means for detecting a rotational amount of the ball, a control means for controlling a cursor position on a display according to the rotational amount detected by the rotational amount detection means, a static electricity conducting member provided near the open portion of the ball retaining member, static electricity flowing into the static electricity conducting member, and a static electricity releasing member electrically connected to the static electricity conducting member to externally release the static electricity.

The present invention further provides a coordinate input device which includes an insulating housing having an accommodating portion whose upper end is open, a ball rotatably accommodated in the accommodating portion, a ball retaining member having an open portion from which part of the ball protrudes, a rotational amount detection means supported on the housing for detecting a rotational amount of the ball, and a printed circuit board on which a conductive pattern through which a signal output from the rotational amount detection means is supplied to a control circuit is formed. The coordinate input device controls a cursor position on a display according to the rotational amount of the ball protruding from the open portion of the ball retaining member. A static electricity conducting member is provided on a rear surface of the ball retaining member close to a peripheral edge of the open portion, and a static electricity releasing pattern is provided on the printed circuit board. A static electricity releasing member is provided to electrically connect the static electricity conducting member to the static electricity releasing pattern.

When the static electricity charged on the operator is discharged to the ball, it enters the coordinate input device from a gap between the ball and the open portion of the ball retaining member, and then is grounded through the static electricity conducting member provided on the rear surface of the ball retaining member, the static electricity releasing member connected to the static electricity conducting member and then the static electricity releasing pattern on the printed circuit board.

BRIEF DESCRIPTION OF THE DRAWINGS

FIG. 1 is a front view of an embodiment of a coordinate input device according to the present invention;

FIGS. 3(a) and 3(b) are perspective views of a retainer provided in the coordinate input device of FIG. 1, as seen when looking from the rear surface side thereof;

FIG. 4 is a perspective view of a modification of a printed circuit board according to the present invention.

DETAILED DESCRIPTION OF THE PREFERRED EMBODIMENT

An embodiment of the present invention will be described below with reference to the accompanying drawings.

Figure 2:
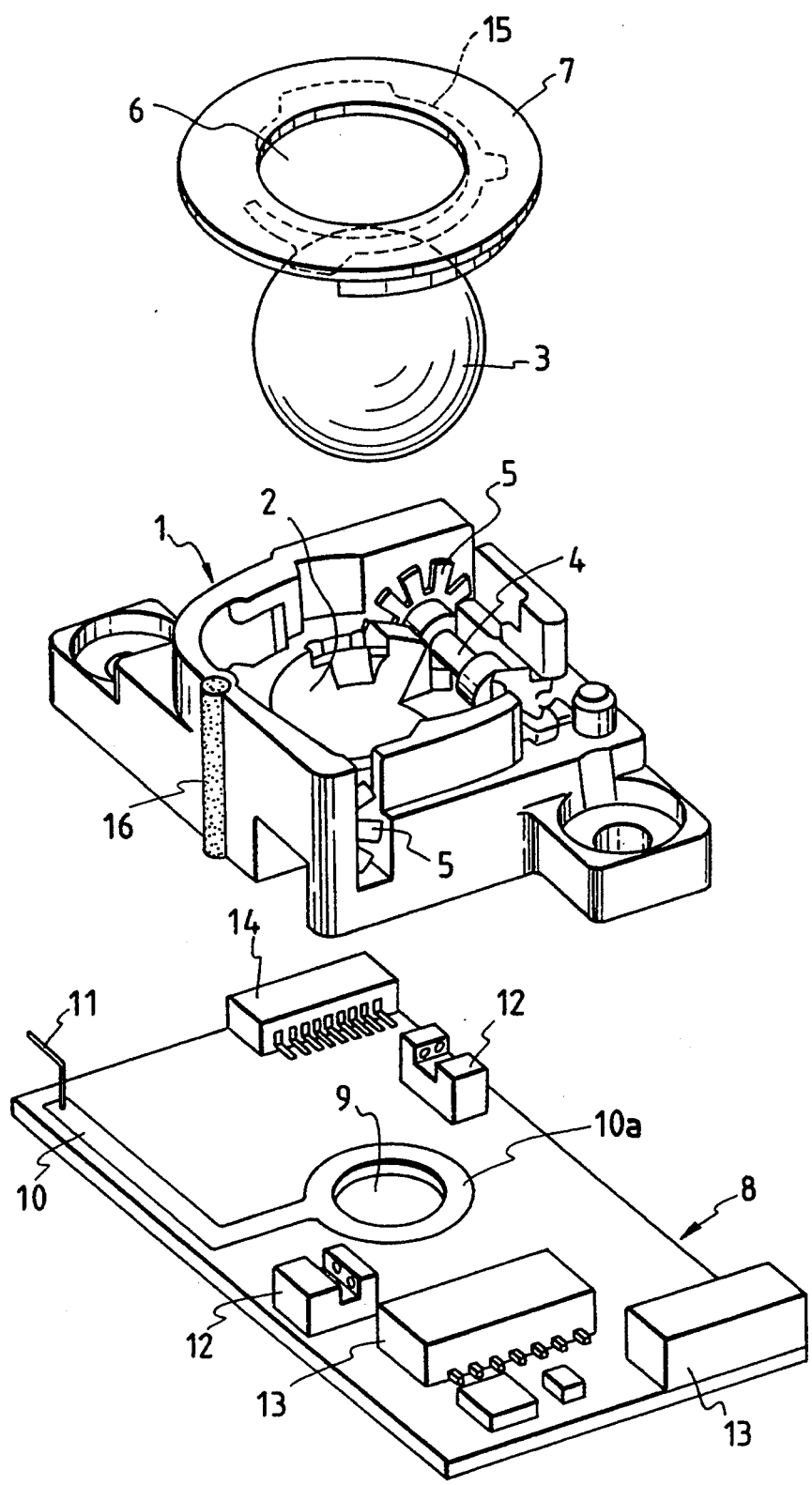
FIG. 2 is an exploded perspective view of the coordinate input device of FIG. 1.
Figure 5:
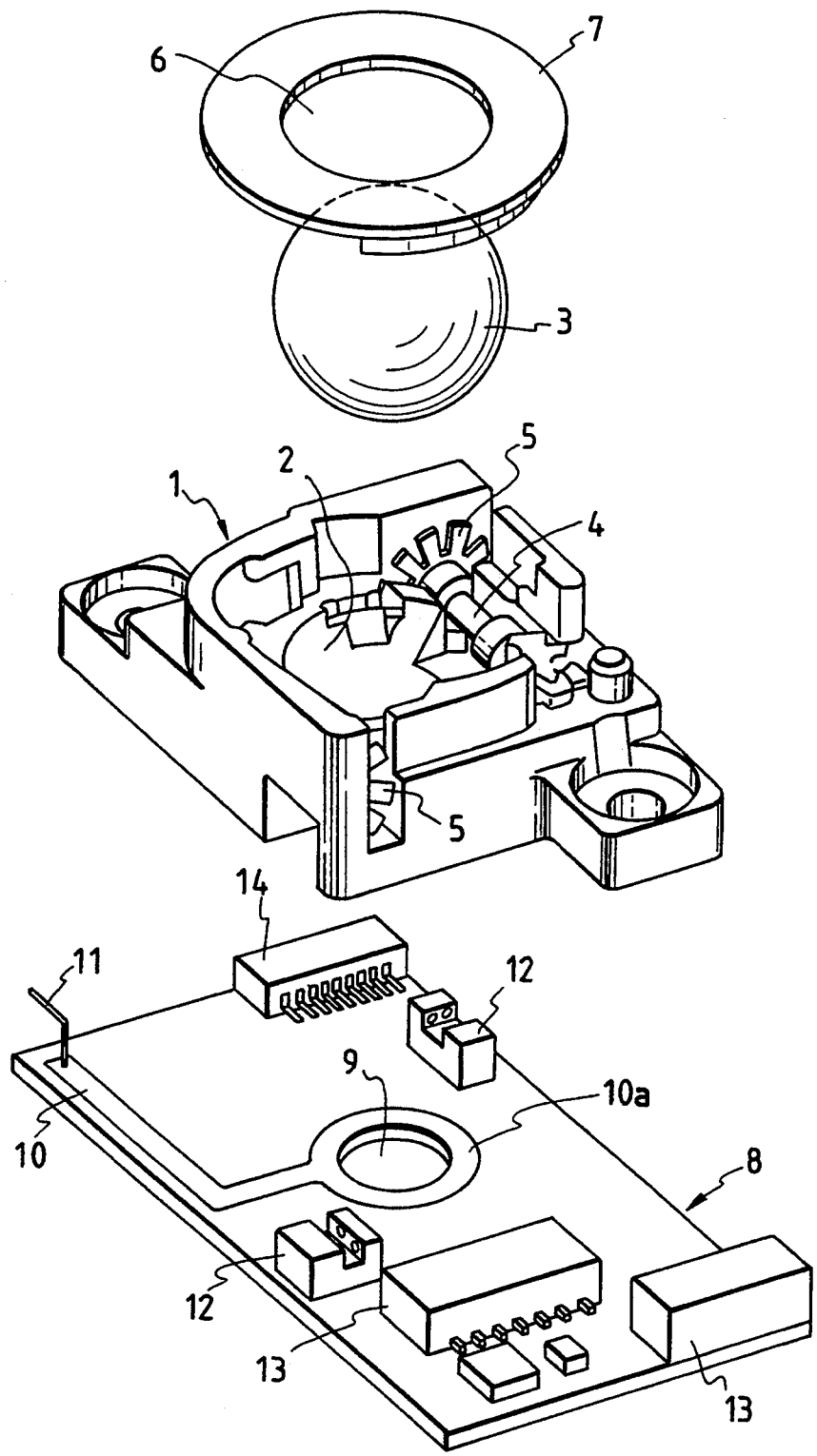
FIG. 5 is an exploded perspective view of a conventional coordinate input device.

FIG. 1 is a front view of an embodiment of a coordinate input device according to the present invention. FIG. 2 is an exploded perspective view of the coordinate input device of FIG. 1. FIG. 3 is a perspective view of a retainer provided in the coordinate input device of FIG. 1, as seen when looking from the rear surface side thereof.

Referring first to FIG. 2, a housing 1 made of a synthetic resin has a semi-spherical accommodating portion 2 which is open at both upper and lower surfaces thereof. A ball 3, which may be a steel ball, is rotatably accommodated in the accommodating portion 2. In the housing 1, a pair of metal rotary shafts 4 are rotatably provided substantially perpendicular to each other in such a manner that they are in contact with the ball 3. A code plate 5 is fixed to one end of each of the rotary shafts 4. A retainer 7 is mounted on the upper end of the housing 1 by an adequate fixing means, e.g., by using the bayonet mounting method. The retainer 7 is made of a synthetic resin, and has an open portion 6 at the center thereof. The upper end of the ball 3 protrudes outwardly from the open portion 6 so that the operator can hand operate it. A printed circuit board 8 has a through-hole 9. The housing 1 is placed on and fixed to the printed circuit board 8 with the lower end of the ball 3 located within the through-hole 8 so as to avoid contact of the ball 3 with the printed circuit board 8. On the printed circuit board 8 are also fabricated detecting devices 12 each having a light-emitting element and a light-receiving element disposed such that they sandwich the code plate 5, a circuit device 13 constituting the control circuit, a connector 14 and so on. Both of the detecting devices 12 are connected to the circuit device 13 by a conductive pattern which is not shown.

A conductive ring 15, serving as a static electricity conducting member, is fixed to the rear surface of the retainer 7. A conductive connection pin 16, serving as a static electricity releasing member, is fixed to the side surface of the housing 1 to connect the conducting ring 16 to the static electricity releasing pattern 10 on the printed circuit board 8.

The conductive ring 15 has a protruding portion 15a and mounting holes 15b. The conducting ring 15 is fixed to the rear surface of the retainer 7, as shown in FIG. 3 (b), by inserting the protruding portion 15a and the mounting holes 15b into an engaging groove 7a and pins 7b, respectively, as shown in FIG. 3 (a), and then by caulking the pins 7b. In that configuration, the inner peripheral edge of the conducting ring 15 is substantially in alignment with the outer peripheral edge of the open portion 9 formed in the retainer 7. The connection pin 16 is embedded in the housing 1 by an outsert or press fitting. The upper and lower ends of the connecting pin 16 are in contact with the lower surface of the conducting ring 15 and the upper surface of the static electricity releasing pattern 10, respectively.

In the thus-arranged coordinate input device, when the static electricity charged on the operator is discharged to the ball 3, it is transmitted from the surface of the ball to the static electricity releasing pattern 10 both through the ring portion 10a and through the conductive ring 15 and then the connection pin 16. Thus, the static electricity which has entered the coordinate input device from the gap between the ball 3 and the open portion 6 securely flows into the static electricity releasing pattern 10 through the conductive ring 15 and the connection pin 16. Consequently, there is no possibility that the static electricity enters the control circuit through the rotary shafts 4 or the like, and erroneous detection or circuit breakage can thus be completely prevented. Furthermore, since the path through which the static electricity flows to the static electricity releasing pattern 10 is attained by the conductive ring 15 and the connection pin 16, the retainer 7 and the housing 1 can be formed of a synthetic resin, which can readily be molded or colored and which is thus advantageous in terms of production cost.

In this embodiment, the conductive ring 15, serving as the static electricity conducting member, is mounted on the retainer 7 after both the conducting ring 15 and the retainer 7 have been prepared. However, the conducting ring 15 may be replaced by a conductive coating formed on the rear surface of the retainer 7 by deposition or sputtering.

Furthermore, in this embodiment, the connection pin 16, serving as the static electricity releasing member, is fixed to the housing 1. However, the connection pin 16 may be mounted on the printed circuit board 8 upright, as shown in FIG. 4. Alternatively, a conductive coating may be formed on the housing 1 by deposition or sputtering to replace the connection pin 16.

Furthermore, in this embodiment, the retainer 7 is used as the ball retaining member which prevents detachment of the ball 3 from the accommodating portion 2 of the housing 1. However, where the coordinate input device is provided integrally with a keyboard, an open portion from which the ball protrudes may be provided in a ceiling surface of a casing which forms the outer skin of the keyboard so as to allow the ceiling surface of the casing to be utilized as the ball retaining member. In that case, the static electricity conducting member, such as the conducting ring, may be provided on the rear surface of the ceiling surface of the casing.

As will be understood from the foregoing description, it is possible according to the present invention to provide a coordinate input device which is capable of securely releasing the static electricity charged on the operator to the static electricity releasing pattern through the static electricity conducting member and the static electricity releasing member, and which is thus highly reliable.

What is claimed is:

1. A coordinate input device comprising:
   a lower housing having a ball accommodating portion;
   a ball rotatably accommodated in said ball accommodating portion;
   a ball retaining member having an open portion from which part of said ball protrudes, said ball retaining member retaining said ball in said ball accommodating portion;
   a rotational amount detection means for detecting a rotational amount of said ball;
   a substrate connected to said lower housing and including an electrical conduction pattern formed on a surface thereof;
   a static electricity conducting member contacting said ball;
   a static electricity releasing member provided on said lower housing and electrically connected to said static electricity conducting member to externally release the static electricity; and
   a static electricity releasing pattern formed on said substrate and electrically connected to said static electricity releasing member.

2. A coordinate input device according to claim 1, wherein said static electricity conducting member is a ring-shaped member formed of a conductive material.

3. A coordinate input device according to claim 1, wherein said static electricity releasing member is received in a vertical hole formed in said lower housing and is electrically connected to both said static electricity conducting member and said static electricity releasing pattern.

4. A coordinate input device according to claim 1, wherein said static electricity releasing member is a film of a conductive material formed on a side wall of said lower housing.

5. A coordinate input device including an insulating housing having an accommodating portion whose upper end is open, a ball rotatably accommodated in said accommodating portion, a ball retaining member having a open portion from which part of said ball protrudes, a rotational amount detection means supported on said housing for detecting a rotational amount of said ball, and a printed circuit board on which a conductive pattern through which a signal output from said rotational amount detection means is supplied to a control circuit is formed, said coordinate input device controlling a cursor position on a display according to the rotational amount of said ball protruding from said open portion of said ball retaining member,
   the improvement being characterized in that a static electricity conducting member is provided on a rear surface of said ball retaining member, in that a static electricity releasing pattern is provided on said printed circuit board, and in that a static electricity releasing member is provided to electrically connect said electricity conducting member to said static electricity releasing pattern.

6. A coordinate input device comprising:
   a lower housing;
   a substrate connected to said lower housing, the substrate including a surface and a static electricity releasing pattern formed on the surface;
   an upper housing connected to the lower housing, the upper housing and lower housing defining a ball receiving chamber, the upper housing having an upper surface defining an opening;
   a ball rotatably received in the ball receiving chamber, the ball including a lower portion contacting the static electricity releasing pattern, and an upper portion protruding through the opening;
   a rotational amount detection means for detecting a rotational amount of said ball;
   a static electricity conducting member disposed in the ball receiving chamber between the opening and the substrate, the static electricity conducting member contacting the ball and being electrically connected to the static electricity releasing pattern.

7. A coordinate input device according to claim 6, wherein said static electricity conducting member is connected to the upper housing.

8. A coordinate input device according to claim 6, wherein said static electricity conducting member is a ring-shaped member formed of a conductive material.

* * * * *